(12) United States Patent
Fedko et al.

(10) Patent No.: US 9,338,137 B1
(45) Date of Patent: May 10, 2016

(54) SYSTEM AND METHODS FOR PROTECTING CONFIDENTIAL DATA IN WIRELESS NETWORKS

(71) Applicant: Kaspersky Lab ZAO, Moscow (RU)

(72) Inventors: Oleg A. Fedko, Moscow (RU); Alexey V. Klimenchuk, Moscow (RU)

(73) Assignee: AO KASPERSKY LAB, Moscow (RU)

(*) Notice: Subject to any disclaimer, the term of this patent is extended or adjusted under 35 U.S.C. 154(b) by 0 days.

(21) Appl. No.: 14/622,183

(22) Filed: Feb. 13, 2015

(51) Int. Cl.
*H04L 29/06* (2006.01)
*H04W 12/10* (2009.01)
*H04W 76/02* (2009.01)
*G06F 21/62* (2013.01)

(52) U.S. Cl.
CPC ............ *H04L 63/04* (2013.01); *G06F 21/6218* (2013.01); *H04L 63/105* (2013.01); *H04L 63/1408* (2013.01); *H04L 63/20* (2013.01); *H04L 63/205* (2013.01); *H04W 12/10* (2013.01); *H04W 76/022* (2013.01)

(58) Field of Classification Search
CPC ...... H04L 63/105; H04L 63/20; H04L 63/205
USPC ................................................ 726/1; 713/151
See application file for complete search history.

(56) References Cited

U.S. PATENT DOCUMENTS

| | | | |
|---|---|---|---|
| 7,733,804 B2 | 6/2010 | Hardjono et al. | |
| 7,904,727 B2 | 3/2011 | Bleckmann et al. | |
| 8,327,131 B1 | 12/2012 | Hardjono et al. | |
| 8,443,189 B2 | 5/2013 | Li et al. | |
| 8,677,497 B2 | 3/2014 | Basavapatna et al. | |
| 8,793,763 B2 | 7/2014 | Williams et al. | |
| 8,855,313 B2 | 10/2014 | Kumoluyi et al. | |
| 2002/0087479 A1* | 7/2002 | Malcolm | 705/64 |
| 2005/0021862 A1* | 1/2005 | Schroeder et al. | 709/246 |
| 2005/0138417 A1 | 6/2005 | McNerney et al. | |
| 2007/0180495 A1 | 8/2007 | Hardjono et al. | |
| 2008/0137593 A1 | 6/2008 | Laudermilch et al. | |
| 2008/0201763 A1 | 8/2008 | Lynn et al. | |
| 2012/0036550 A1 | 2/2012 | Rodriguez et al. | |
| 2013/0014263 A1 | 1/2013 | Porcello et al. | |
| 2013/0054611 A1* | 2/2013 | Lee | 707/741 |
| 2013/0097710 A1 | 4/2013 | Basavapatna et al. | |
| 2013/0103653 A1* | 4/2013 | Carson et al. | 707/690 |
| 2013/0298192 A1 | 11/2013 | Kumar et al. | |
| 2014/0215580 A1* | 7/2014 | Behringer et al. | 726/5 |
| 2014/0250533 A1 | 9/2014 | Basavapatna et al. | |
| 2014/0282978 A1* | 9/2014 | Lerner et al. | 726/7 |
| 2014/0310770 A1 | 10/2014 | Mahaffey et al. | |
| 2014/0310815 A1 | 10/2014 | Bailey | |
| 2014/0325586 A1 | 10/2014 | Halliday et al. | |

OTHER PUBLICATIONS

ISO/IEC 7812-1:2006, Identification Cards—Identification of Issuers. Part 1: Number System. Abstract. Accessed Feb. 13, 2015. http://www.iso.org/iso/catalogue_detail?csnumber=39698.

* cited by examiner

Primary Examiner — Saleh Najjar
Assistant Examiner — Peiliang Pan
(74) Attorney, Agent, or Firm — Patterson Thuente Pedersen, P.A.

(57) ABSTRACT

Systems and methods can detect the unintended transfer of confidential data or confidential information over wireless networks. Further, systems and methods can prevent, wholly or in part, the loss of confidential user data during transfer of data through a wireless network. A protection rule or option can be selected according to a certain security level of a wireless network. Additionally, data can be subsequently transferred in accordance with the selected protection option.

18 Claims, 6 Drawing Sheets

SYSTEM AND METHODS FOR PROTECTING CONFIDENTIAL DATA IN WIRELESS NETWORKS

TECHNICAL FIELD

The invention relates generally to wireless networks and, more particularly, to computing systems and associated methods for protecting confidential data transmitted over wireless networks.

BACKGROUND

Wireless networks have become highly popular as a tool for gaining access to the Internet and other networks. The demand for this type of access has grown and continues to grow because of the proliferation of modules and access methods and access hardware for connection to wireless networks in current devices. For example, mobile telephones, smartphones, pocket PCs, notebooks, tablet computers, digital music players can all have different networking connection hardware and software. In such devices, access to a wireless network can be made by the particular networking hardware and software. Subsequently, connection to any number of networks and the Internet can be made.

Traditionally, wireless networks can be of two types. A first wireless network type includes networks meeting GSM, GPRS, EDGE, SDMA standards (known as 3G), WiMax and LTE standards (known as 4G). A second wireless network type includes networks meeting IEEE 802.11 standards (known as Wi-Fi networks). Networks of the first type (3G and 4G) can generally be deployed over a large geographic area. Networks of the first type typically require payment for access. Networks of the second type (Wi-Fi) can generally be deployed over a small geographic area. Networks of the second type typically have a relatively high data transfer speed.

As a result, networks in the second category have become very popular with companies who, in order to attract clients or to increase competitiveness, create wireless local area networks (WLANs) on the basis of a Wi-Fi network and provide free access for connection to the Internet. Access can be provided to clients or potential clients, for example. Hotels, restaurants, shopping centers, airports, and subways have all utilized this strategy.

Each wireless network has an access point, through which various client devices are connected to the network. A wireless access point can include a wireless set of receiving and transmitting components. Such wireless components can be configured to ensure wireless access to an existing network (wireless or wired), or configured to create a new network. A wireless access point allows for the establishment and connection of various client devices to a wireless network. Further, a wireless access point allows for the expansion of an existing wireless network by connecting to a provider on a wireless network, to thereby act as a wireless bridge for connecting two separated wired or wireless networks.

Device users who utilize Wi-Fi network access points can thus connect to the network access point and access the Internet and other networks. For example, users can then communicate on social networks, access websites, check email, perform banking transactions, and other computer-network based interactions.

However, users who access such wireless networks assume a level of risk. For example, when connecting to a wireless networks through a network access point, a user can be deceived by intruders or offenders, and the user's activity on the network can be accessible to these third parties. It is therefore desirable to warn the user about possible consequences of connecting to and using wirelesses networks, and to further inform the user about the trustworthiness of the access point.

Another issue relating to the access of wireless networks concerns the transmission of confidential information. Such information, including user names, passwords, account numbers, and other confidential information, is often sent "in the open" or "in the clear" over wireless networks. This information can be intercepted and used by third parties or offenders; for example, by a man-in-the-middle attack. It is therefore desirable to detect the unintended transfer of confidential data or confidential information over wireless networks.

Therefore, there is a need for systems and methods for detecting the unintended transfer of confidential data or confidential information over wireless networks. Moreover, there is a need for systems and methods that allow for an automatic determination of the safety of a wireless network in real time, and to heuristically detect the transfer confidential data and to create protected channels for the transfer of confidential data depending on the required level of protection.

SUMMARY

Embodiments of the present application substantially meet the aforementioned needs of the industry. In an embodiment, systems and methods can detect the unintended transfer of confidential data or confidential information over wireless networks. Further, systems and methods can prevent, wholly or in part, the loss of confidential user data during transfer of data through a wireless network. In embodiments, protection rule or option can be selected according to a certain security level of a wireless network. Further, data can be subsequently transferred in accordance with the selected protection option.

In an embodiment, a system for protecting data transferred over a wireless network having a wireless access point comprises: a computing platform including computing hardware of at least one processor and memory operably coupled to the at least one processor; a network interface in electrical communication with the computing hardware and operably coupled to the wireless access point and configured to transmit outgoing wireless network data and receive incoming wireless network data to the system over the wireless network; and instructions that, when executed on the computing platform, cause the computing platform to implement: a network traffic interception engine configured to intercept wireless network data transmitted over the wireless network, a wireless networks database storage engine configured to store historical wireless network data and heuristic records, a wireless networks analysis engine configured to analyze the intercepted wireless network data and determine a trust level of the wireless network using at least one of the historical wireless network data or the heuristic records, a traffic monitoring engine configured to receive the determination of the trust level of the wireless network and detect transfer of confidential data over the wireless network, and a protection engine configured to determine a network resource type and secure the wireless network for the confidential data based at least on the network resource type, if confidential data is detected over the wireless network.

In an embodiment, a machine-implemented method for protecting data transferred from an electronic device to a remote server over a wireless network having a wireless access point, the traffic over the wireless network including outgoing traffic and incoming traffic comprises detecting that the electronic device is operably coupled to the wireless network through the wireless access point; determining a trust level of the wireless network; if the trust level of the wireless network is safe, tracking changes of one or more parameters of the wireless network; if the trust level of the wireless network is unsafe, monitoring the traffic to determine confidential data within the traffic; and analyzing the outgoing traffic and, if no confidential data is determined within the outgoing traffic, allowing the outgoing traffic through to the wireless access point, and if confidential data is determined within the outgoing traffic, applying one or more rules to protect the confidential data.

In an embodiment, a machine-implemented method for protecting data transferred from an electronic device to a remote server over a wireless network, the electronic device including a computing platform including computing hardware of at least one processor, memory operably coupled to the at least one processor, and a network interface in electrical communication with the computing hardware and operably coupled to the wireless network comprises determining a network resource type of the remote server; attempting to execute a first protection rule, the first protection rule specific to protecting confidential data related to the network resource type; if the first protection rule cannot be executed, attempting to execute a second protection rule, the second protection rule specific to protecting confidential data related to the network resource type; and transferring confidential data from the network interface to the remote server over the wireless network in accordance with the executed first protection rule or second protection rule.

The above summary is not intended to describe each illustrated embodiment or every implementation of the invention. The figures and the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
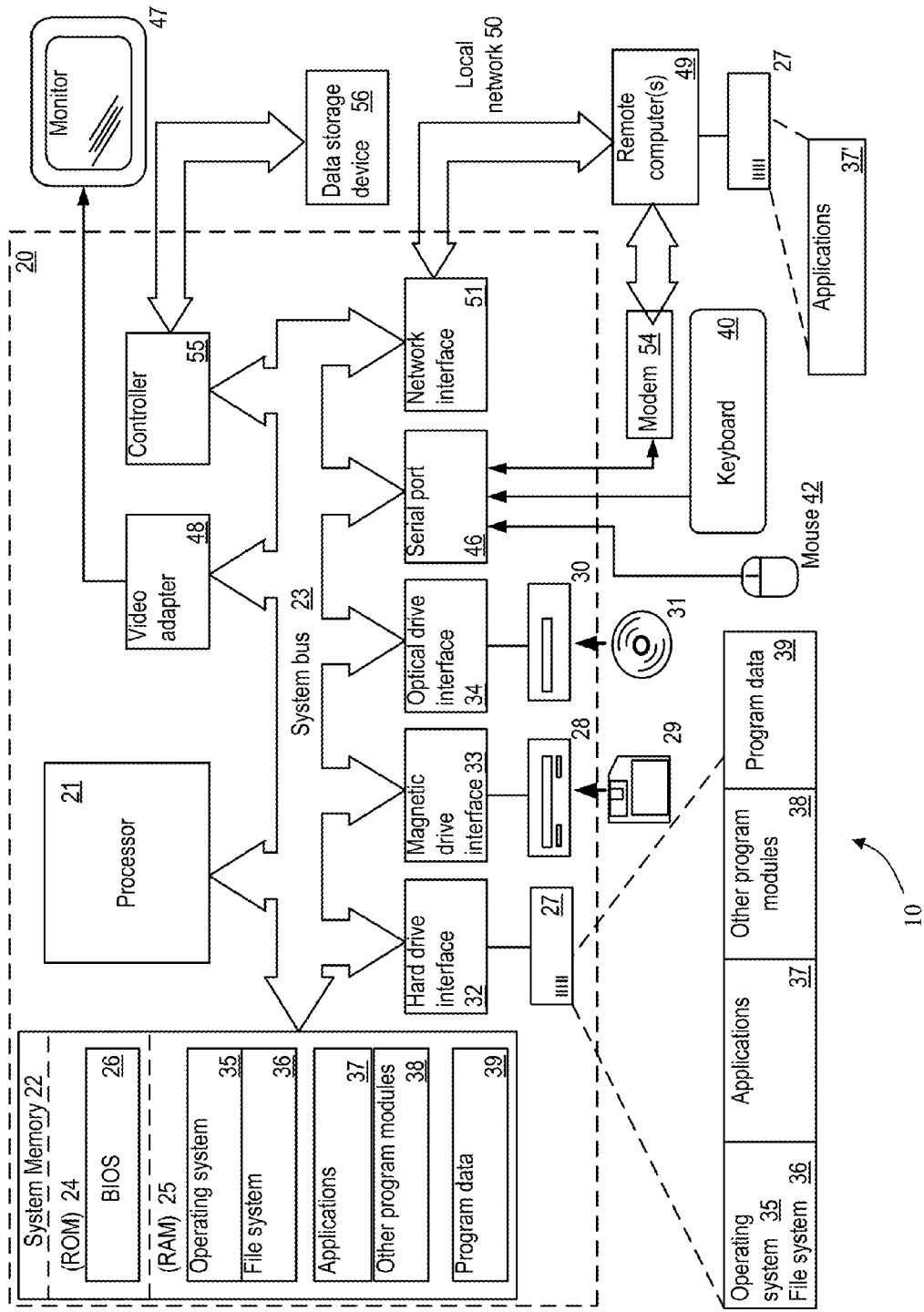
FIG. 1 is a block diagram of a computer system on which various engines can carry out a function or set of functions of the instant invention, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

Aspects of the invention are directed towards systems and methods for protecting confidential data transmitted over wireless networks.

A computer system on which aspects of the invention can be implemented can be one physical machine, or can be distributed among multiple physical machines, such as by role or function, or by process thread in the case of a cloud computing distributed model. In various embodiments, aspects of the invention can be configured to run in virtual machines that in turn are executed on one or more physical machines. It will be understood by persons of skill in the art that features of the invention may be realized by a variety of different suitable machine implementations.

The system includes various engines, each of which is constructed, programmed, configured, or otherwise adapted, to autonomously carry out a function or set of functions. The term engine as used herein is defined as a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Referring to FIG. 1, a block diagram of a computer system 10 is depicted on which various engines can carry out a function or set of functions of the instant invention, according to various embodiments.

The computer system 10 can comprise a computing device such as a personal computer 20 includes one or more central processing units 21, a system memory 22 and a system bus 23, which contains various system components, including a memory connected with the one or more central processing units 21. In various embodiments, the central processing units 21 can include multiple logical cores that are able to process information stored on computer readable media. The system bus 23 is realized as any bus structure known at the relevant technical level, containing, in turn, a bus memory or a bus memory controller, a peripheral bus and a local bus, which is able to interact with any other bus architecture. The system memory includes non-volatile memory such as Read-Only Memory (ROM) 24 or volatile memory such as Random Access Memory (RAM) 25. The Basic Input/Output System (BIOS) 26 contains basic procedures ensuring transfer of information between the elements of personal computer 20, for example, during the operating system boot using ROM 24.

Personal computer 20, in turn, has a hard drive 27 for data reading and writing, a magnetic disk drive 28 for reading and writing on removable magnetic disks 29, and an optical drive 30 for reading and writing on removable optical disks 31, such as CD-ROM, DVD-ROM and other optical media. The hard drive 27, the magnetic drive 28, and the optical drive 30 are connected with system bus 23 through a hard drive interface 32, a magnetic drive interface 33 and an optical drive interface 34, respectively. The drives and the corresponding computer information media represent energy-independent means for storage of computer instructions, data structures, program modules and other data on personal computer 20.

The system depicted includes hard drive 27, a removable magnetic drive 29 and a removable optical drive 30, but it should be understood that it is possible to use other types of computer media, capable of storing data in a computer-readable form (solid state drives, flash memory cards, digital disks, random-access memory (RAM), etc.), connected to system bus 23 through a controller 55. In an embodiment, data storage device 56 can be used.

The computer 20 comprises a file system 36, where the recorded operating system 35 is stored, as well as additional program applications 37, other program engines 38 and program data 39. The user can input commands and information into the personal computer 20 using input devices (keyboard 40, mouse 42). Other input devices (not shown) can also be used, such as: a microphone, a joystick, a game console, a scanner, etc. Such input devices are usually connected to the computer system 20 through a serial port 46, which, in turn, is connected to a system bus, but they can also be connected in a different way—for example, using a parallel port, a game port or a Universal Serial Bus (USB). The monitor 47 or another type of display device is also connected to system bus 23 through an interface, such as a video adapter 48. In addition to monitor 47, personal computer 20 can be equipped with other peripheral output devices (not shown), such as speakers, a printer, etc.

Personal computer 20 is able to work in a network environment; in this case, it uses a network connection with one or several other remote computers 49. Remote computer(s) 49 is (are) similar personal computers or servers, which have most or all of the above elements, noted earlier when describing the substance of personal computer 20 shown in FIG. 1. The computing network can also have other devices, such as routers, network stations, peering devices or other network nodes.

Network connections can constitute a Local Area Network (LAN) 750 and a Wide Area Network (WAN). Such networks are used in corporate computer networks or in corporate intranets, and usually have access to the Internet. In LAN or WAN networks, personal computer 20 is connected to the Local Area Network 50 through a network adapter or a network interface 51. When using networks, personal computer 20 can use a modem 54 or other means for connection to a wide area network, such as the Internet. Modem 54, which is an internal or an external device, is connected to system bus 23 through serial port 46. It should be clarified that these network connections are only examples and do not necessarily reflect an exact network configuration, i.e. in reality there are other means of establishing a connection using technical means of communication between computers.

Figure 2:
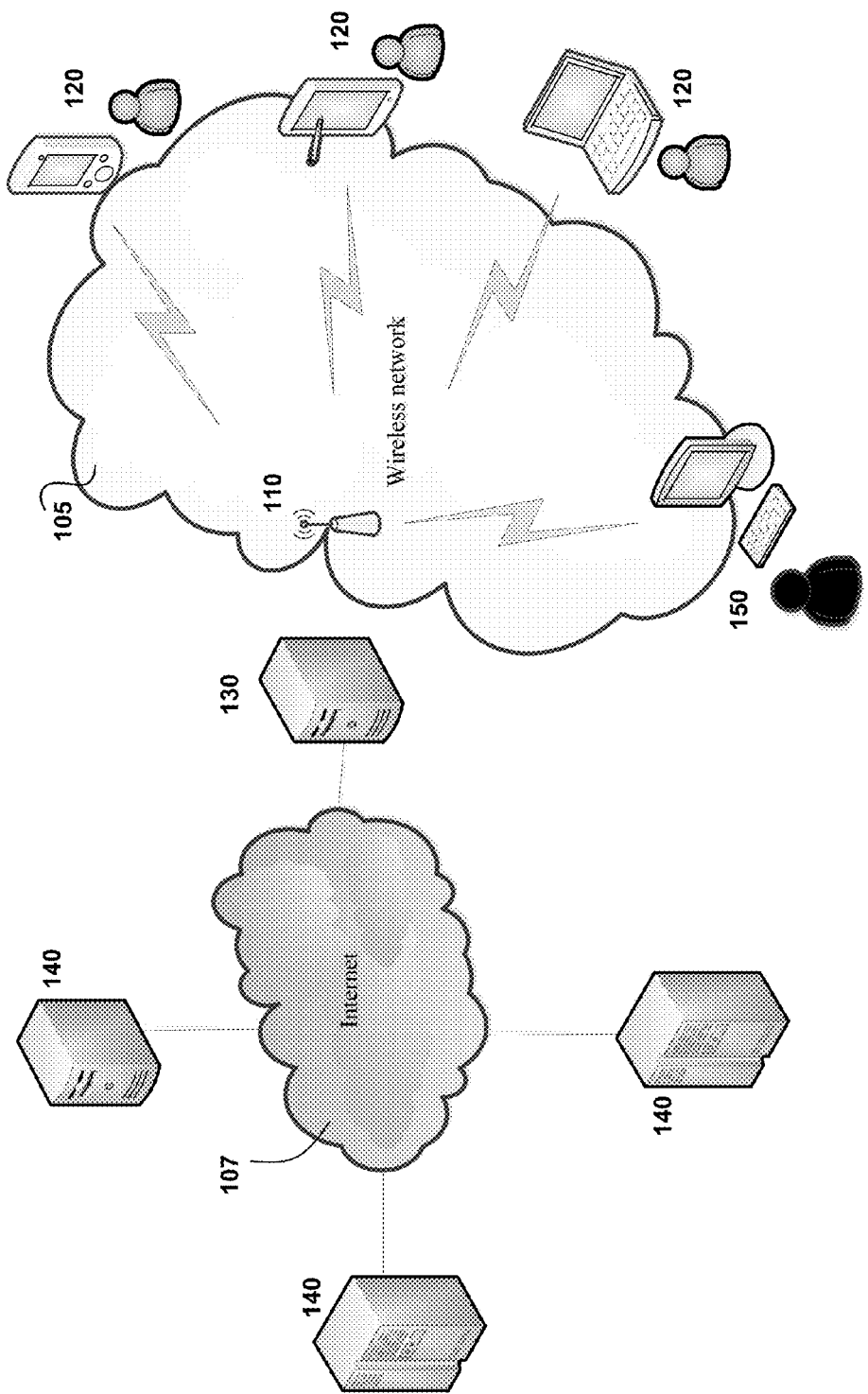
FIG. 2 is a block diagram of a public wireless network including access to the Internet, according to an embodiment.

Referring to FIG. 2, a block diagram of a public wireless network 105 including access to the Internet 107 is depicted, according to an embodiment. Access to the Internet 107 is provided using a wireless access point 110. In an embodiment, access by wireless access point 110 is provided by the IEEE 802.11 connection standard (known as Wi-Fi). In embodiments, other network connections can also be utilized by wireless access point 110. As depicted, wireless network 105 comprises a single wireless access point 110. However, in embodiments, wireless network 105 can comprise multiple or a plurality of wireless access points 110.

The network connection via wireless access point 110 allows user devices 120 to gain access to various network resources 140. In an embodiment, user devices 120 can comprise mobile telephones, smartphones, pocket PCs, notebooks, tablet computers, digital music players, or any other suitable electronic device. Network resources 140 can comprise any content server, routing server, data storage server, or any other suitable network resource.

In an example, user devices 120 can access the Internet 107 using wireless access point 110 as if devices 120 were connected to the Internet 107 using a hardwired connection. In an embodiment, when wireless network 105 is configured, access point 110 is connected to a provider 130. In embodiments, wireless access point 110 is connected to provider 130 using one of asymmetric digital subscriber line (ADSL) technology, 3G, 4G, or a local Ethernet network.

In order to connect to wireless access point 110 of deployed network 105, each device 120 must have a wireless adapter meeting the connection standard. As depicted in FIG. 2, network 105 comprises a Wi-Fi network and the connection standard is Wi-Fi. In an embodiment, a connection is made by wireless access point 110 of the relevant Wi-Fi network 105. In an embodiment, the operation range of wireless access point 110 is limited only by the hardware or software capabilities of wireless access point 110. The wireless network 105 can be public (for example, airports, coffee shops, or offices), or private (for example, hotels, houses, or apartments of users). Typically, the difference between public and private wireless networks includes a protected password for access to private networks, and/or allowing connection of only a limited group of trusted persons to private networks. For example, connection to a hotel wireless network requires an access password, and this password is usually known to all hotel guests who are not trusted. Consequently, even though the network has an access password, it is not private. Differences in data transfer are also possible. For example, on public wireless networks, data transfer is usually made in the open, while on private wireless networks, data transfer is encrypted.

In embodiments, depending on the implementation, network resources 140 can comprise, for example, a device or information stored on an outside computer system. In embodiments, it is possible to gain remote access to a specific network resource 140 from another computer through the Internet 107. For example, information stored on an outside computer can comprise a web page located on an Internet server. Access to network resources 140 can be either free or limited. Access can be gained by accessing a network address or a domain name of the network resource, where the network address is the unique ID of the resource. An example of an address can be an Internet Protocol (IP) address, which comprises a unique network address of a node in a computer network built using an IP protocol; for example, 208.73.211.176. In another example, a URL (Uniform Resource Locator) comprises a uniform indicator of the network resource, which is a standardized method for recording the address of the resource on the Internet network; for example http://www.kaspersky.com.

In operation, when any of devices 120 interfaces with network resource 140 using wireless network 105, all network traffic between device 120 and network resource 140 is transferred through access point 110. Network traffic can contain both common (non-confidential) information and confidential information. Confidential information can comprise information related to property or personal identifiers. In an embodiment, confidential information requires protection in accordance with requirements established by the owner of the information. Examples of such information are personal data, including mailbox password, name of the user, network or website username or password, social security number, individual taxpayer number, or financial information, such as a bank account number or credit card number.

In embodiments, access point 110 of wireless network 105 can be insufficiently protected or otherwise compromised by an offender 150. For example, offender 150 can have privileged access to wireless network 105 or access point 110. In another example, wireless network 105 or access point 110 can be created by offender 150. As a result, offender 150 can have access to the network traffic going through access point 110, and subsequently to both common and confidential user information.

A wireless network can have insufficient protection mechanisms; for example, a wireless network having an access password created by a hotel. In this example, when a client (user) of the hotel is connected to the wireless network, the user may believe that the network is protected, because he was provided a private key (password) for connecting to the network. However, in most cases, the network is insufficiently protected. The password provided for the wireless network may be known not only to this client, but also to other clients of the hotel, or even to third parties. This is because, when such networks are implemented, the concern is not about the safety of the network, but about the convenience of access to clients and to the wireless network. Therefore, a password for such networks is usually either quite simple or easy to obtain, as it is often posted publicly, for example, on bulletin boards or on client information pamphlets or receipts. In other cases, the password can be discovered using a "brute force" attack method.

A wireless network can be compromised; for example, a public network allowing access to any user having suitable networking hardware and software. In this example, any offender 150 can gain access to the public network. Subsequently, using various methods, offender 150 can also obtain privileged status (for example, administrator access rights) on the relevant wireless network. For example, vulnerabilities in the software of access point 110 can allow offender 150 to grant himself access rights other than the access rights given by default. In addition, the transfer of data on a public wireless network is usually made in the open, which can often be easy for an offender to intercept. The creation of a protected (for example, encrypted) data transfer channel is more resource-consuming than a transfer in the open.

Embodiments therefore minimize the risks that information will be intercepted by third parties (for example, by offender 150). Embodiments further transfer confidential data over a wireless network utilizing the most appropriate option for the protection of that confidential information.

Figure 3:
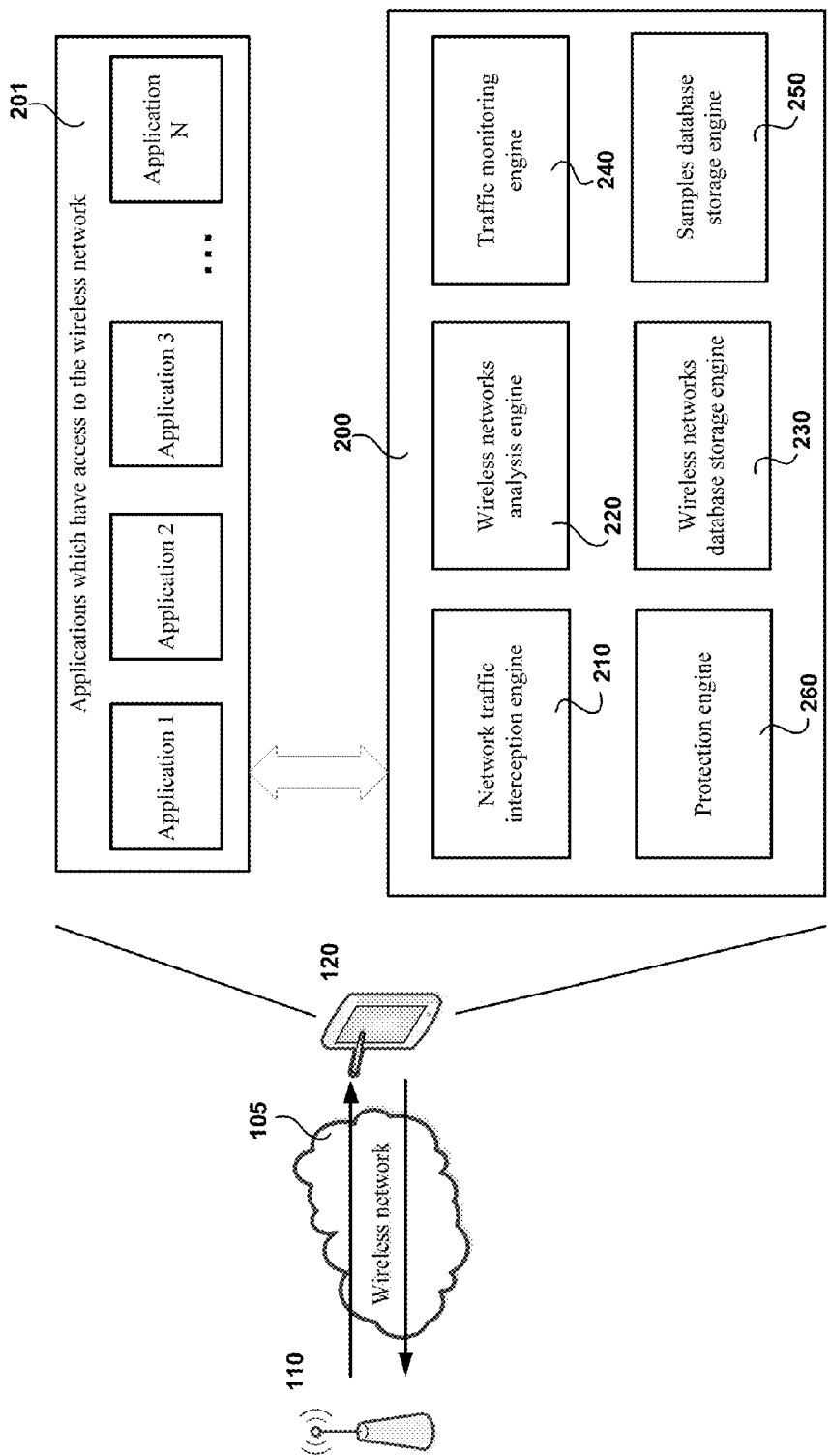
FIG. 3 is a block diagram of a device including a protection system for the secure transfer of confidential information across a wireless network, according to an embodiment.

Referring to FIG. 3, a block diagram of a device 120 including a system for the secure transfer of information across a wireless network 105 is depicted, according to an embodiment. System 200 allows for the protection of information or data (including confidential information) from theft or interception by third parties during transfer through a wireless network.

Device 120 comprises a number of applications 201 configured to access network resources as directed by the user, or configured to access network resources in support of other "local" applications. For example, an application can periodically establish connection with network resources to update the software version of the application. In another example, the user can direct an application to connect to a remote network resource. For example, Application 1 in FIG. 3 can comprise a web browser, such as Google Chrome, and the remote network resource can comprise a website. The connection to the website is made, for example, by the user clicking on a hyperlink referring to the relevant network address, or by the user entering the network address in the browser's address field.

In an embodiment, system 200 comprises a network traffic interception engine 210, a wireless network analysis engine 220, a wireless network database storage engine 230, a traffic monitoring engine 240, a samples database storage engine 250 and a protection engine 260.

Network traffic interception engine 210 is configured to detect a connection to network resources. In an embodiment, if the subsequent network communication occurs on wireless network 105 using the Wi-Fi standard, network traffic interception engine 210 intercepts all information (network traffic) being sent to device 120 and received from device 120. In another embodiment, if the subsequent network communication occurs on a wireless network using a communication standard or protocol other than Wi-Fi, network traffic interception engine 210 can ignore the network traffic being sent to device 120 and received from device 120. In an embodiment, if the subsequent network communication occurs on a wireless network using a communication standard or protocol other than Wi-Fi, network traffic interception engine 210 is configured to intercept all network traffic being sent to device 120 and received from device 120. In still other embodiments, network traffic interception engine 210 can selectively intercept network traffic being sent to device 120 and received from device 120. In an embodiment, network traffic interception engine 210 can be a communications component of device 120 that is utilized to connect with access point 110; for example, network interface 51 as described in FIG. 1.

In an embodiment, information about the connected wireless network 105 and the network traffic intercepted by interception engine 210 is provided to wireless network analysis engine 220. In embodiments, information about the connected wireless network 105 and the network traffic intercepted by interception engine 210 is further provided to traffic monitoring engine 240.

Wireless network analysis engine 220 is configured to determine, using at least one piece of information received from interception engine 210, a level of trust (safety) of wireless network 105. In an embodiment, interception engine 210 can provide information to analysis engine 220 related to the wireless network. In an embodiment, interception engine 210 can provide information to analysis engine 220 that characterizes access point 110. In other embodiments, additional data or information can be included in determining a level of trust of wireless network 105. In an embodiment, a safety level is determined by analysis of the data available on device 120 about the connected wireless network and the information received from the interception engine 210 on access point 110.

In an embodiment, interception engine 210 can provide information to analysis engine 220 related to the wireless network. Information related to wireless network 105 can be entered by either the user during the setup of the wireless network, or the information can be determined automatically by authorization or interrogation with wireless network access point 110. For example, in an embodiment, information can include the name of the wireless network. In an embodiment, information can include a status of the network (for example, public, private or personal). In an embodiment, information can include the existence and type of encryption used for data transfer. In an embodiment, information can include the existence (utilization) and reliability of a connection password. In an embodiment, information can include data related to an authorization set. For example, such data can become available to a user or device 120 after successful authorization. In an embodiment, information can include the popularity of the wireless network. For example, such data or information can include a number of unique devices that have connected to the network in a given time period, such as a day, week, or month). In an embodiment, information can include the trust level of the wireless network. For example, such data or information can include the trust level chosen by the user during the setup of the network.

In an embodiment, interception engine 210 can provide information to analysis engine 220 that characterizes access point 110. For example, in an embodiment, information can include the network address of the wireless access point. In an embodiment, information can include the availability of network protection technologies (for example, WPA, WPA2). In an embodiment, information can include a relative diagram of control of encryption keys. In such embodiments, a global positioning system (GPS) can be utilized to determine the physical location of the device (street, building, library, subway, etc.). In an embodiment, information can include a service set identifier (SSID) and/or basic service set identification (BSSID). In an embodiment, information can include the throughput capacity of the channel. In an embodiment, information can include various statistical data or data sets; for example, the operation time and the frequency of change of setup parameters.

Wireless network analysis engine 220 is configured to analyze received information or data using heuristic records stored in wireless network database storage engine 230. Each heuristic record contains a combination of criteria describing the relevant wireless network and a finding on its safety.

For example, a heuristic record of "Public/without authorization/not encrypted" can characterize that the wireless network was identified by the user or identified automatically as a general access network, for example, a subway network. In embodiments, there can be no need to enter a password when connecting to the network, or the authorization is a formality, while the data transfer is made without any encryption.

In another example, a heuristic record of "Public/with authorization/a simple password/encrypted/low encryption type" can characterize the network as identified as a public network which requires authorization, contains a widespread password (for example, is listed as one of 100 most popular passwords) and has an insufficient encryption level (for example, WEP).

In another example, a heuristic record of "Private/with authorization/password/encrypted/low encryption type" can characterize the network as identified as a private network, which requires authorization, contains a sufficient level password (for example, is not listed as one of the 100 most popular passwords and has over 6 characters) and has an insufficient encryption level (for example, WPA).

In another example, a heuristic record of "Personal/with authorization/password/encryption/high type" can characterize the network as identified as a personal wireless network of the device user, which requires authorization, contains a sufficient level password and has a high encryption type (for example, WPA2 AES).

The foregoing data examples and criteria combinations in no way limit the type of data or analysis that can be used, as these embodiments are given only by way of example and are not intended to limit the scope of the invention.

In an embodiment, heuristic records can be built by an individual user. In another embodiment, heuristic records can be built by a remote server or third party. In another embodiment, heuristic records can be built using self-teaching methods. For example, a profile of a wireless network can be generated that contains characteristics of the wireless network including statistical data on the operation of the wireless network. An analysis of the gathered statistical data can be made to generate a particular heuristic record.

Depending on the heuristic record defined, a finding is made on the safety level of the wireless network. In an embodiment, the safety level can be determined either expressly (for example, safe or unsafe), or not expressly (for example, as a percentage of ideal safety or as a point scale). Information about the trust level of wireless network 105 can be sent to traffic monitoring engine 240.

In an embodiment, if there is not enough information to make an analysis and to issue a finding about the trust level of the wireless network, wireless network analysis engine 220 can forward the request to a remote server. In such embodiment, the remote server can access or is provided additional information to make an analysis and to issue a finding about the trust level of the wireless network. In requests sent to a remote server, the reply by the remote server will contain a finding about the trust level that is signed using an electronic digital signature in order to prevent distortion of the reply by third parties in, for example, the case of unforeseen interception.

In another embodiment, wireless network analysis engine 220 can also provide, to wireless networks database storage engine 230, for storage purposes, information about the issued findings on the connected wireless networks. Subsequently, wireless network analysis engine 220, before the next analysis of the wireless network, can perform a preliminary analysis based on the previously saved information about the issued findings. In addition, wireless networks database storage engine 230 can also be updated with information about the safety level of wireless networks from external sources.

Traffic monitoring engine 240 is configured to detect a transfer of confidential information through a wireless network. In an embodiment, traffic monitoring engine 240 is configured to utilize samples database storage engine 250 in order to detect the transfer of confidential information through a wireless network. For example, information about the trust level of the wireless network can be received by traffic monitoring engine 240 from wireless network analysis engine 220. In an embodiment, once that trust level is received, traffic monitoring engine 240 begins monitoring the incoming and outgoing data streams (traffic). In an embodiment, when monitoring the incoming traffic, traffic monitoring engine 240 analyzes the entire incoming stream of data sent to device 120 through wireless network 105. In other embodiments, one or more portions of the stream of data sent to device 120 are analyzed.

In an embodiment, traffic monitoring engine 240 is configured to detect the transfer of confidential information in an analysis composed of two parts, i.e. a primary analysis and a secondary analysis. During the primary analysis, wireless network analysis engine 220 identifies the type of the protocol used during data transfer. In an embodiment, a "safe" or "unsafe" determination can be made for the type of protocol used. In embodiments, a type determination can be made by analyzing the header information in the protocol. In other embodiments, other information can be utilized. In an embodiment, protocol type identification can be made by the analysis of the hardware port(s) through which traffic is received.

If a "safe" protocol type is identified, no secondary analysis is made, in an embodiment. Otherwise, if the protocol type is identified as "unsafe," a secondary analysis can be made. For example, a "safe" protocol is an HTTPS protocol. In another example, an unsafe protocol is an HTTP protocol.

A secondary analysis comprises analyzing the structure of the data being transferred within the boundaries or structure of the particular protocol. For example, an HTML file can be analyzed within the boundaries or structure of the HTML protocol. In an embodiment, traffic monitoring engine 240 and the secondary analysis can search for fields in the structure of the data being transferred that could contain confidential information in order to create records (samples) with such fields. For example, in an HTML file, a user can enter text into fields called confidential information; for example, a password, a login username, or a credit card number. Upon identification of such a field, traffic monitoring engine 240 is configured to build records based on the identified field. In embodiments, traffic monitoring engine 240 is further configured to send the records to samples database storage engine 250 to be stored. In an embodiment, a record comprises at least two portions. For example, a first portion comprises the return address for delivery (for example, a URL), and the second portion contains an identified section where confidential information might be potentially entered in the outgoing traffic. In an embodiment, during the analysis of the structure of the data being transferred, a transmission of the reply containing the fields where confidential information can be entered using a safe-type data transfer protocol. Consequently, in an embodiment, records wherein a first portion contains the return address in accordance with the safe protocol type can be thereby skipped when analyzing the outgoing traffic.

According to an embodiment, when monitoring the outgoing traffic, traffic monitoring engine 240 is configured to identify an attempt to transmit confidential information through an unsafe connection on an unsafe network using heuristic methods. One of the heuristic methods comprises comparing data contained in the outgoing traffic with built records (an example of the building of records is provided below). In an embodiment, a comparison occurs in two steps. First, a match with the first part of the record is detected. Second, a match with the second part of the record is detected. During the comparison of the second part of the record with the data being transferred, a change in relation to the sample is determined. If a change is present, traffic monitoring engine 240 suspends the transfer of confidential information and makes a request for protection engine 260. The request contains information about the activated record. In an embodiment, during the comparison of the first part of the record and during the determination of the return address in accordance with a safe protocol type, no analysis of the second part is made.

In another embodiment, traffic monitoring engine 240 is configured to identify an attempt to transmit confidential information through an unsafe connection on an unsafe network by identifying the presence of confidential information, such as a credit card number, in POST requests. In such embodiments, an analysis of POST requests is made on the condition of determination of transfer through an unsafe connection, which was found during the analysis of the incoming traffic, as described above.

Examples of the above-described analysis of incoming traffic, the subsequent building of records, and analysis of outgoing traffic can be further understood by the following illustrative examples. The following examples in no way limit the type of analysis or record building that can be used, as these embodiments are given only by way of example and are not intended to limit the scope of the invention.

EXAMPLE 1

In an example embodiment, device 120 is connected to a network resource, for example, one of network resources 140, as shown in FIG. 2. An HTML file is received by device 120 from network resource 140. In other words, an HTML file is found within the incoming traffic data stream.

Traffic monitoring engine 240 is therefore configured to analyze the code implemented in the HTML file. During the analysis, a search is made for fields containing strings related to the entry of confidential information. If a suitable field is found, traffic monitoring engine 240 builds a record containing a network address (hyperlink) and the implemented code containing the string for confidential information. Subsequently, in the outgoing traffic, traffic monitoring engine 240 is configured to identify all POST requests and compare them with the first portions of the built records. In case of match of the first portion, traffic monitoring engine 240 determines a change in accordance with the second portion of the matching record. If a change is found, i.e. the form being transmitted is different from the form in the second part of the record, then transmission of confidential information is determined to be present An example of analysis of code in a HTML file and of the building of a record is discussed below with respect to interaction with the website http://rbc.ru/.

```
<form method="POST" action="http://mail.qip.ru/auth/logon/"
onSubmit="return isQipEMailAddr(this, this.elements['user'], this.elements['domain']);">
    <input type="hidden" name="reason" value="login">
    <input type="text" name="user" style="width: 100px;" class="vertMiddle" value="name">
    <input name="pass" value="password" class="gray" style="width: 100px; margin-right: 22px;" type="password">
    <input value="enter" style="width: 88px;" type="submit"></form>.
```

When a record is built in light of the example code segment copied above, the first portion of the record contains a hyperlink, specifically, "http://mail.qip.ru/auth/logon/", and the second portion of the record contains a tag form for the entry of a name and password: input name="pass" . . . "type="password".

Further, embodiments can comprise a return network address including a safe data transfer protocol. For example, with respect to interaction with the http://mail.ru website, an example of an analysis of the implemented code in an HTML file is shown below.

```
. . . <method="post" action="https://auth.mail.ru/cgi-bin/auth?from=splash">
<div class="mailbox_auth_layout_row mailbox_auth_layout_row_login">
<div class="mailbox_auth_layout_row_col mailbox_auth_layout_row_col_right">
```

```
<select         id="mailbox_login_domain"         size="1"
name="Domain"                              tabindex="4"
class="mailbox_login_domain"> . . .
```
For example, when the record is built in light of the example code segment copied above, the first portion contains a hyperlink which has a safe data transfer protocol, specifically, "https://auth.mail.ru/cgi-bin/auth?from=splash".

EXAMPLE 2

In another example embodiment, device 120 is connected to a network resource, for example, one of network resources 140, as shown in FIG. 2. Network resource 140 is configured to receive and process payment of goods being purchased with a credit card. For example, network resource 140 is configured for interaction with a mobile application to a remote service. In other words, data related to the mobile application having a remote service is found within the incoming traffic data stream. In an embodiment, in the outgoing traffic, when POST requests are found, in addition to the determination of the presence of a change, the presence of a card number is also determined, using heuristic methods, on the basis of known data or information related to credit cards (for example, http://www.iso.org/iso/catalogue_detail?csnumber=39698), which is herein incorporated by reference in its entirety. In an embodiment, the location at which confidential information is received will be analyzed or otherwise checked. For example, a determination can be made as to whether the link is an official link of a bank.

In an embodiment, if the information received from wireless network analysis engine 220 about the trust level of the wireless network indicates that the wireless network is completely safe, traffic monitoring engine 240 will not monitor the traffic. Wireless network analysis engine 220 is configured to track the changes in the parameters of the wireless network and, if changes appear, wireless network analysis engine 220 can re-assess the trust level of the wireless network.

Protection engine 260 is configured to select the required method of safe connection for transfer of confidential information. In embodiments, protection engine 260 is further configured to build the safe connection. In an embodiment, such selection and connection establishment utilizes the information received from traffic monitoring engine 240, specifically, the information about the matching record. Protection engine 260 is configured to use the information about the matching record to determine the type of network resource to which the confidential information is to be sent. In embodiments, network resources are classified by type. Network resource types can include services for making financial transactions, services requiring authorization, corporate services, file and video hosting, and other resources.

In an embodiment, protection engine 260 is configured to select the method of safe connection at least on the basis of a network resource type in accordance with selection rules which are predetermined to match the specifics of each type of network resource. Network resource classification can be by comparison with a network resources database, analysis against rules for defining the network resource type, or other suitable methods.

For example, when a credit card number and/or card reference number is transmitted to a network resource, it can be prudent to protect or secure all subsequent data as well. In embodiments, once a credit card number and/or card reference number is transmitted, all subsequent data is necessarily protected or secured.

In another example, when a password or a login to a mail site is transmitted, it can be prudent to subsequently protect or secure the mail data as well. In embodiments, once a password or a login to a mail site is transmitted, all subsequent data is necessarily protected or secured.

In another example, when a password or a login to a theme-based website is transmitted, it can be sufficient to protect only the transmission of the confidential information itself. For example, for a user transmission password or a login to an automobile forum, only the password or a login is protected. All subsequent data can be passed in the clear.

In another example, wherein the network resource comprises a company or private server, and wherein internal information is transmitted, it can be prudent to protect all data transferred during the transmission session.

In another example, wherein the network resource comprises a file hosting server, it is possible that no protection is needed when transferring information. In other embodiments, partial or whole protection can be implemented when transferring information.

In embodiments, a number of examples of rules for selecting a particular protection scheme for the connection for a network resource type are depicted below. In an embodiment, when applying individual selection rules, protection engine 260 executes a subsequent rule only if it is impossible to execute the previous rule. In other embodiments, protection engine 260 is configured to selectively execute rules based on other criteria, including whether previous or subsequent rules can be executed, or whether previous rules have been executed.

A network connection type comprises "services for making financial transactions," in an embodiment. In a method for protection, protection engine 260 is configured to:
 (1) create a connection using secure protocol; for example, a secure socket layer (SSL) protocol;
 (2) notify a user that confidential information is being transmitted through an unsafe wireless network;
 (3) block the transfer of confidential information; and
 (4) interrupt the connection with the remote server or network resource.

Protection engine 260 therefore protects confidential information in a financial transaction service connection.

A network connection type comprises "services requiring authorization," in an embodiment. In a method for protection, protection engine 260 is configured to:
 (1) create a connection using secure protocol; for example, an SSL protocol;
 (2) create a temporary virtual private network (VPN) connection;
 (3) notify a user that confidential information is being transmitted through an unsafe wireless network;
 (4) make a request to the user confirming the transfer through an unsafe wireless network; and
 (5) interrupt the connection with the remote server or network resource.

Protection engine 260 therefore protects confidential information in a connection related to services requiring authorization.

A network connection type comprises "corporate services," in an embodiment. In a method for protection, protection engine 260 is configured to:
 (1) create a permanent VPN connection;
 (2) create a temporary VPN connection and notify a user;
 (3) notify the user that confidential information is being transmitted through an unsafe wireless network; and
 (4) interrupt the connection with the remote server or network resource.

Protection engine 260 therefore protects confidential information in a corporate services or company environment connection.

A network connection type comprises "file hosting," in an embodiment. In a method for protection, protection engine 260 is configured to:
(1) create a connection using secure protocol; for example, an SSL protocol;
(2) create a temporary VPN connection for sending only confidential information;
(3) notify the user that confidential information is being transmitted through an unsafe wireless network; and
(4) continue transfer through the unsafe wireless network.

Protection engine 260 therefore protects confidential information in a file hosting connection. One skilled in the art will readily understand that other methods for building selection rules can also be applied. Moreover, common rules can be assigned for all network resource types. For example, if the network resource supports an SSL protocol, this transfer method can be used first, in embodiments.

Figure 4:
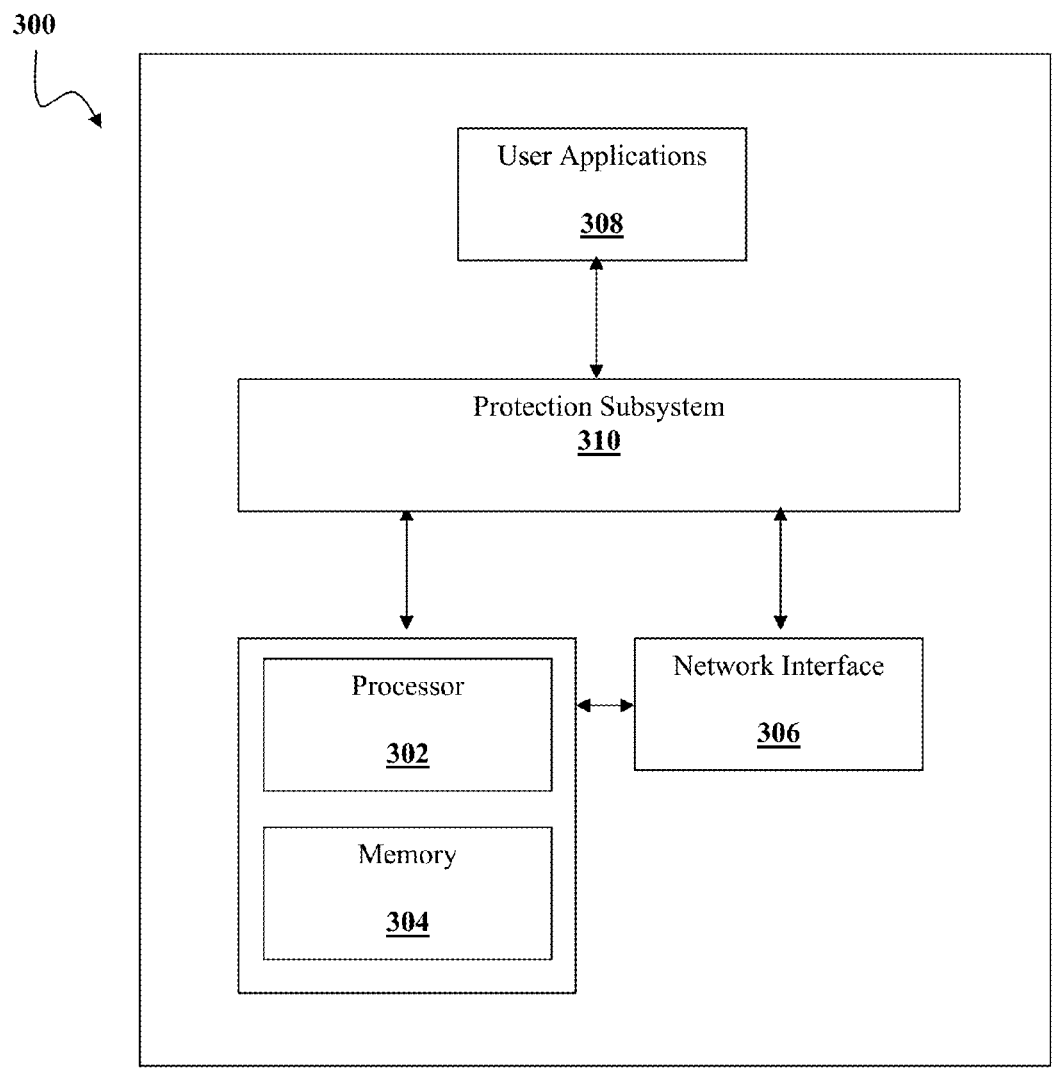
FIG. 4 is a block diagram of a system for the secure transfer of information across a wireless network, according to an embodiment.

Referring to FIG. 4, a block diagram of a system 300 for the secure transfer of information across a wireless network, is depicted according to an embodiment. System 300 generally comprises processor 302, memory 304, network interface 306, user applications 308, and protection subsystem 310.

In an embodiment, processor 302 can be any programmable device that accepts digital data as input, is configured to process the input according to instructions or algorithms, and provides results as outputs. In an embodiment, processor 302 can be a central processing unit (CPU) configured to carry out the instructions of a computer program. Processor 302 is therefore configured to perform basic arithmetical, logical, and input/output operations.

Memory 304 can comprise volatile or non-volatile memory as required by the coupled processor 302 to not only provide space to execute the instructions or algorithms, but to provide the space to store the instructions themselves. In embodiments, volatile memory can include random access memory (RAM), dynamic random access memory (DRAM), or static random access memory (SRAM), for example. In embodiments, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the invention.

Network interface 306 comprises a communications component configured to connect with an access point. For example, network interface 306 can comprise a component or components substantially similar to network interface 51 as described in FIG. 1. Network interface 306 can be configured to interface to access point 110 of wireless network 105, as depicted in FIG. 3. In an embodiment, as depicted in FIG. 4, network interface is operably coupled to processor 302 and memory 304. For example, processor 302 can interface to or otherwise command network interface 306.

User applications 308 can comprise software or executable applications configured to access network resources as directed by the user, or configured to access network resources in support of other "local" applications. In an embodiment, user applications 308 are substantially similar to applications 201 as described in FIG. 3.

Protection subsystem 310 comprises a number of engines, or components implemented using hardware, or as a combination of hardware and software, such as by processor 302 and a set of program instructions that adapt the engine to allow for the protection of information or data (including confidential information) from theft or interception by third parties during transfer through a wireless network. In an embodiment, protection subsystem 310 is substantially similar to system 200 as described in FIG. 3.

As depicted, protection subsystem 310 acts as a barrier between user applications 308 and processor 302, memory 304, and network interface 306. Protection subsystem is configured so that any communication by user applications 308 to network interface 306, or any use of processor 302 or memory 304 as directed by user applications 308 is authorized by protection subsystem 310. Likewise, any communication from processor 302, memory 304, or network interface 306 to user applications 308 is authorized by protection subsystem 310. In embodiments, authorization comprises a simple passthrough. In other embodiments, authorization comprises one or more of the methods of protecting information or data during transfer through the wireless network as described herein.

Figure 5:
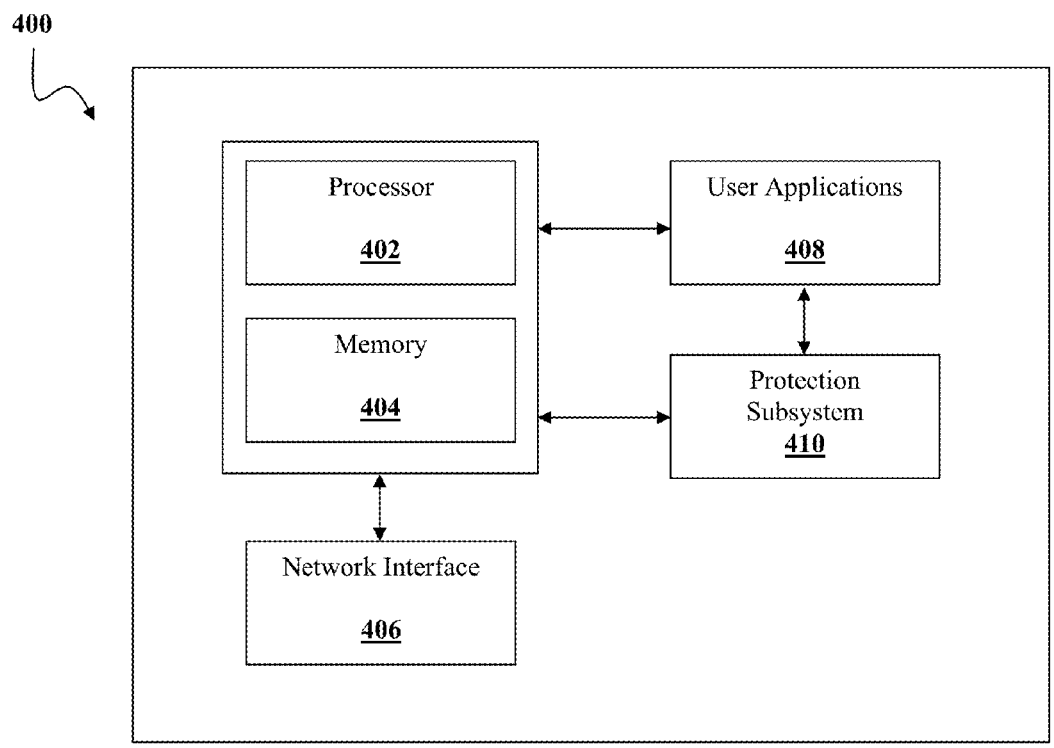
FIG. 5 is a block diagram of a system for the secure transfer of information across a wireless network, according to an embodiment.

In another embodiment, referring to FIG. 5, a block diagram of a system 400 for the secure transfer of information across a wireless network, is depicted. In an embodiment, system 400 generally comprises processor 402, memory 404, network interface 406, user applications 408, and protection subsystem 410.

In an embodiment, processor 402 is substantially similar to processor 302, memory 404 is substantially similar to memory 304, and network interface 406 is substantially similar to network interface 306. Further, in embodiments, user applications 408 comprises software or executable applications configured to access network resources as directed by the user, or configured to access network resources in support of other "local" applications that is substantially similar to user applications 308.

Protection subsystem 410 comprises a number of engines, or components implemented using hardware, or as a combination of hardware and software, such as by processor 302 and a set of program instructions that adapt the engine to allow for the protection of information or data (including confidential information) from theft or interception by third parties during transfer through a wireless network. In an embodiment, protection subsystem 410 is substantially similar to protection subsystem 310. As depicted in FIG. 5, protection subsystem 410 acts not as a barrier, but as an integrated component that is configured to selectively monitor and/or protect any of processor 402, memory 404, network interface 406, and user applications 408. For example, protection subsystem 410 can be configured to access data from or deny data to any of the aforementioned components, but in a non-serial or non-barrier fashion. One skilled in the art will readily appreciate that any number of protection subsystem architectures are possible within the scope of the invention.

Figure 6:
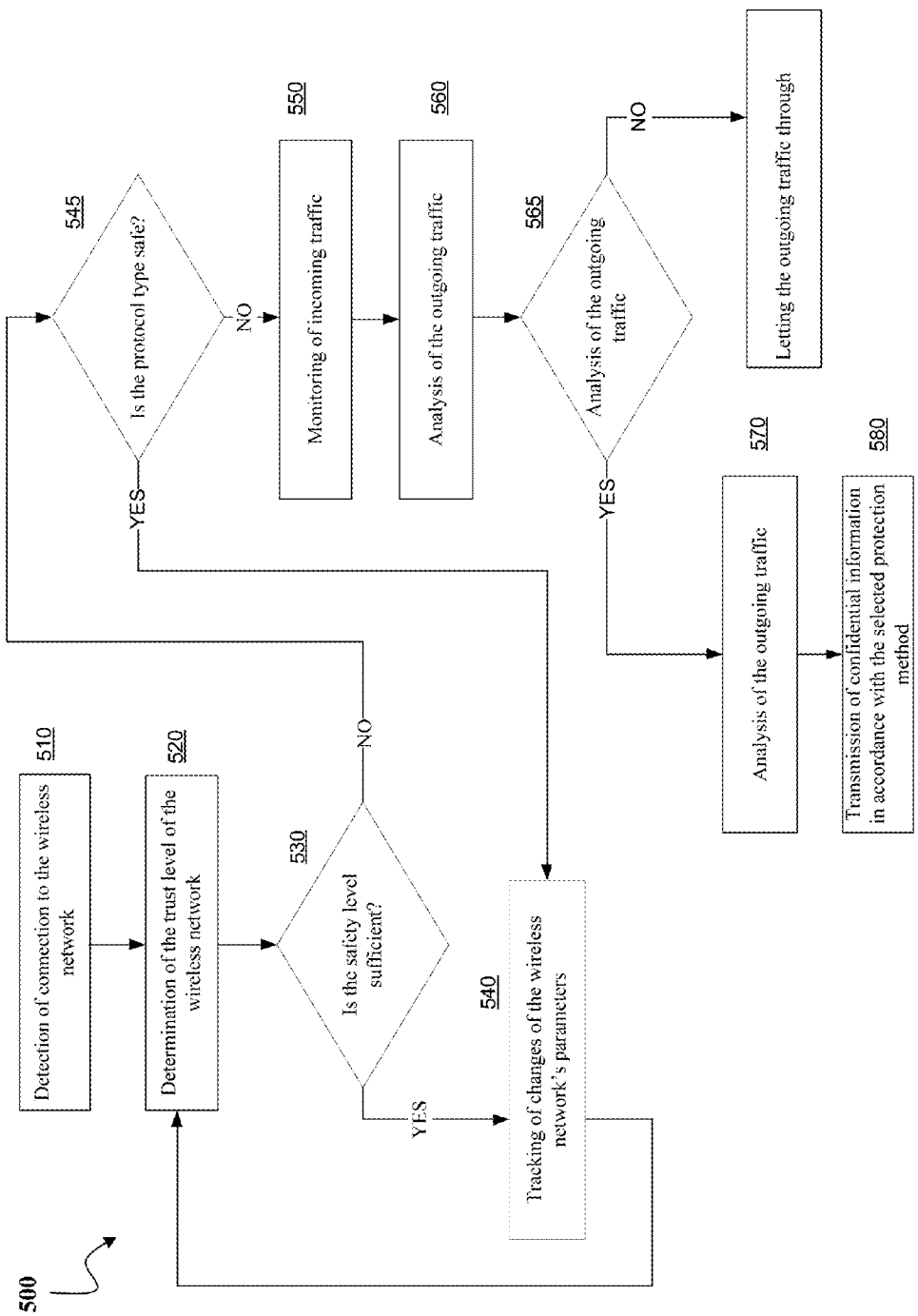
FIG. 6 is a flowchart of a method of secure transfer of confidential information across a wireless network, according to an embodiment.

In operation, referring to FIG. 6, a flowchart of a method 500 of secure transfer of information across a wireless network is depicted, according to an embodiment. In an example embodiment, method 500 can be implemented or otherwise executed by a system such as system 200 or similar systems or subsystems described herein.

At 510, network traffic interception engine 210 detects a connection to a wireless network. In an embodiment, the wireless network is substantially similar to wireless network 105, and the protocol of the wireless network is Wi-Fi.

At 520, wireless network analysis engine 220 determines the trust (safety) level of the connected wireless network. In an embodiment, a trust level is determined at least in part by an analysis of the data accessible on or through device 120 about the connected wireless network and at least in part by the information received from network traffic interception engine 210 about the connected access point of the wireless network. Examples of information that can be utilized are provided throughout; particularly those discussed with respect to FIG. 3. In an embodiment, wireless network analysis engine 220 is configured to perform an analysis using heuristic records stored by wireless networks database storage engine 230. Each heuristic record contains a combination of criteria characterizing the wireless network and a finding on its safety.

At 530, depending on the selected or activated heuristic record, wireless network analysis engine 220 issues a finding related to the safety level of the wireless network.

In an embodiment, if the safety level is sufficient to ensure the integrity of the information being transferred on the wireless network, wireless network analysis engine 220 does not make a request to traffic monitoring engine 240 and method 500 proceeds to 540. In an embodiment, if the safety level is sufficient to ensure the integrity of the confidential information being transferred on the wireless network, wireless network analysis engine 220 does not make a request to traffic monitoring engine 240 and method 500 proceeds to 540.

At 540, wireless network analysis engine 220 tracks the state of the wireless network in order to detect changes in the network. If changes are detected, wireless network analysis engine 220 is configured to revise the finding related to the safety level of the wireless network.

If the safety level is not sufficient to ensure the integrity of the confidential information during transfer on the wireless network, wireless network analysis engine 220 can make a request to traffic monitoring engine 240 to monitor the passing traffic. In an embodiment, a request comprises information about the safety level of the network. Subsequently, traffic monitoring engine 240 is configured to detect the transfer of data or network traffic.

At 545, traffic monitoring engine 240 is configured to determine the protocol used in the detected network traffic. In an embodiment, a determination is made based on the protocol whether the traffic is safe or unsafe. In an embodiment, an analysis of the protocol headers can be used at least in part to determine the safety level. If the traffic is determined to be safe, no further analysis of traffic is made. In embodiments, wireless network analysis engine 220 and protection engine 260 can be notified that the safety level is adequate or "safe."

If the traffic is determined to be unsafe, at 550, traffic monitoring engine 240 performs monitoring of the incoming traffic through the wireless network. In embodiments, traffic monitoring engine 240 can monitor all of the incoming traffic. In other embodiments, traffic monitoring engine 240 can monitor portions or sections of the incoming traffic. As part of traffic monitoring, traffic monitoring engine 240 is configured to determine a structure of the data being sent (for example, an HTML file) within the protocol. In an embodiment, traffic monitoring engine 240 is further configured to search for fields in the structure of the data being transmitted. In embodiments, particular or known fields can be searched-for. For example, a determination of a particular field can indicate the possibility of confidential information in order to create records (samples) with such fields. In an embodiment, a record comprises at least two portions. A first portion comprises a return address for delivery (for example, a URL), and a second portion comprises a detected location or field to which confidential information could be potentially entered during transfer of data in the outgoing traffic. For example, in the incoming traffic, intercepted data includes an HTML file. Subsequently, traffic monitoring engine 240 is configured to search for fields containing strings responsible for the entry of confidential information. If such fields are detected, traffic monitoring engine 240 builds a relevant record.

At 560, traffic monitoring engine 240 performs an analysis of the outgoing traffic from device 120. In an embodiment, an analysis comprises detection of an attempt to send confidential information using an unsafe protocol (through an unprotected channel) by comparing data contained in the outgoing traffic with the built records. In another embodiment, an analysis comprises detection by determining the presence of confidential information in accordance with one or more determination algorithms. For example, an algorithm can be utilized to determine a credit card number or of a checksum of a credit card or other payment card. In an embodiment, referring to the comparison of data contained in the outgoing traffic with the built records, the comparison with the record can occur in two steps. First, a match with the first portion of the record is detected, and second, a match with the second portion of the record is also detected. In an embodiment, in the comparison of the second portion of the record with the data being transmitted, only the presence of any change in relation to the record is determined. For example, in outgoing traffic comprising an HTML file, POST requests in the outgoing traffic can be detected and are subsequently compared with the first portions of the records, and then with the second portions of the records.

At 565, traffic monitoring engine 240 is configured to make a decision on further actions. If no confidential information is detected, traffic monitoring engine 240 simply allows the outgoing traffic through. Conversely, if confidential information is detected, traffic monitoring engine 240 makes a request to protection engine 260 to create a protection method, or otherwise protect the connection. In an embodiment, the request will contain information about the activated or selected record.

At 570, protection engine 260 determines a method of safe connection for the transmission of confidential information. In an embodiment, protection engine 260 determines the type of the network resource to which the confidential information is sent, in accordance with the specified classification. In an embodiment, the network resource type is determined by analyzing the network address (hyperlink). In another embodiment, the network resource type is determined by analyzing the information about the matching record, if sent by traffic monitoring engine 240. In embodiments, the secure or safe connection method is selected on the basis of the determined network resource type and in accordance with the specified selection rules. Selection rules can be built in accordance with the specifics of each type of network resource. Examples of types and selection rules are provided with respect to FIG. 3.

At 580, protection engine 260 creates a selected safe connection for further transmission of the confidential information or of all outgoing traffic (depending on the activated selection rule). Subsequently, the outgoing traffic containing the confidential information is sent through the newly generated safe connection.

The embodiments above are intended to be illustrative and not limiting. Additional embodiments are within the claims. In addition, although as aspects of the present invention have been described with reference to particular embodiments, those skilled in the art will recognize that changes can be made in form and detail without departing from the scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as will be understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

The invention claimed is:

1. A system for protecting data transferred over a wireless network having a wireless access point, the system comprising:
   a computing platform including computing hardware of at least one processor and memory operably coupled to the at least one processor;
   a network interface in electrical communication with the computing hardware and operably coupled to the wireless access point and configured to transmit outgoing wireless network data and receive incoming wireless network data to the system over the wireless network; and
   instructions that, when executed on the computing platform, cause the computing platform to implement:
      a network traffic interception engine configured to intercept wireless network traffic transmitted over the wireless network,
      a wireless networks database storage engine configured to store historical wireless network traffic data and heuristic records,
      a wireless networks analysis engine configured to analyze the intercepted wireless network traffic and determine a trust level of the wireless network using at least one of the historical wireless network traffic data or the heuristic records, wherein analyzing the intercepted wireless network traffic includes identifying one or more fields of a data structure of the intercepted wireless network traffic, wherein confidential data within the intercepted wireless network traffic is unanalyzed,
      a traffic monitoring engine configured to receive the determination of the trust level of the wireless network and detect transfer of confidential data over the wireless network, and
      a protection engine configured to determine a network resource type and secure the wireless network for the confidential data based at least on the network resource type, if confidential data is detected over the wireless network.

2. The system of claim 1, wherein the wireless networks analysis engine is configured to determine a trust level of the wireless network by analyzing header data of a protocol of the incoming wireless network data.

3. The system of claim 1, wherein the instructions cause the computing platform to further implement a samples database storage module configured to build and store records related to the wireless network data.

4. The system of claim 3, wherein the traffic monitoring engine is configured to detect the transfer of confidential data by analyzing outgoing wireless network data against at least one record of the samples database storage module.

5. The system of claim 4, wherein analyzing outgoing wireless network data against at least one record of the samples database storage module comprises:
   determining a match of the outgoing wireless network data with a first portion of the at least one record, and
   if there is a match, determining any change of the outgoing wireless network data in relation to a second portion of the at least one record.

6. The system of claim 1, wherein traffic monitoring engine is configured to detect the transfer of confidential data by identifying confidential data in the outgoing wireless network data.

7. The system of claim 1, wherein the historical wireless network data is a combination pair, and wherein the combination pair comprises a criteria and a safety determination.

8. The system of claim 1, wherein the network traffic interception engine is configured to determine information related to the wireless access point, and wherein the wireless networks analysis engine is configured to determine the trust level of the wireless network at least based on the information related to the wireless access point.

9. The system of claim 1, wherein the protection engine is configured to secure the wireless network by applying at least one rule related to the wireless network.

10. The system of claim 9, wherein the at least one rule is at least one of creating a connection using a secure socket layer (SSL) protocol, notifying a user of the transfer of confidential data, blocking the transfer of confidential data, interrupting the connection with the wireless network, creating a temporary virtual private network (VPN) connection, creating a permanent VPN connection, making a request to the user about continuing the transfer of confidential data, and transferring confidential data through an unsafe wireless network.

11. The system of claim 10, wherein if a first rule cannot be executed, a second rule is executed.

12. The system of claim 1, further comprising at least one user application configured to access the wireless network over the wireless access point using the network interface.

13. A machine-implemented method for protecting data transferred from an electronic device to a remote server over a wireless network having a wireless access point, the traffic over the wireless network including outgoing traffic and incoming traffic, the method comprising:
   detecting that the electronic device is operably coupled to the wireless network through the wireless access point;
   determining a trust level of the wireless network by at least identifying one or more fields of a data structure of the traffic, wherein confidential data within the traffic is unanalyzed;
   if the trust level of the wireless network is safe, tracking changes of one or more parameters of the wireless network;
   if the trust level of the wireless network is unsafe, monitoring the traffic to determine confidential data within the traffic; and
   analyzing the outgoing traffic and, if no confidential data is determined within the outgoing traffic, allowing the outgoing traffic through to the wireless access point, and if confidential data is determined within the outgoing traffic, applying one or more rules to protect the confidential data.

14. The method of claim 13, further comprising building and storing records related to the wireless network data, wherein monitoring the traffic to determine confidential data within the traffic comprises analyzing outgoing traffic against at least one record of the built and stored records related to the wireless network data.

15. The method of claim 14, wherein analyzing outgoing traffic against at least one record of the built and stored records comprises:

determining a match of the outgoing traffic with a first portion of at least one record, and if there is a match, determining any change of the outgoing traffic in relation to a second portion of the at least one record.

16. The method of claim 13, wherein applying one or more rules is at least one of creating a connection using a secure socket layer (SSL) protocol, notifying a user of the transfer of confidential data, blocking the transfer of confidential data, interrupting the connection with the wireless network, creating a temporary virtual private network (VPN) connection, creating a permanent VPN connection, making a request to the user about continuing the transfer of confidential data, and transferring confidential data through an unsafe wireless network.

17. The method of claim 16, wherein if a first rule cannot be executed, a second rule is executed.

18. A machine-implemented method for protecting data transferred from an electronic device to a remote server over a wireless network, the electronic device including a computing platform including computing hardware of at least one processor, memory operably coupled to the at least one processor, and a network interface in electrical communication with the computing hardware and operably coupled to the wireless network, the method comprising:

determining a network resource type of the remote server by at least identifying one or more fields of a data structure of traffic to the remote server or from the remote server, wherein confidential data within the traffic is unanalyzed;

attempting to execute a first protection rule, the first protection rule specific to protecting confidential data related to the network resource type;

if the first protection rule cannot be executed, attempting to execute a second protection rule, the second protection rule specific to protecting confidential data related to the network resource type; and transferring confidential data from the network interface to the remote server over the wireless network in accordance with the executed first protection rule or second protection rule.

* * * * *